US010189350B2

(12) United States Patent
Dudar

(10) Patent No.: US 10,189,350 B2
(45) Date of Patent: Jan. 29, 2019

(54) FUEL DRIP RETENTION

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 83 days.

(21) Appl. No.: 15/407,606

(22) Filed: Jan. 17, 2017

(65) Prior Publication Data

US 2018/0201122 A1 Jul. 19, 2018

(51) Int. Cl.
*B60K 15/035* (2006.01)
*B67D 7/04* (2010.01)
*B67D 7/54* (2010.01)
*B60W 20/00* (2016.01)
*B60K 15/03* (2006.01)

(52) U.S. Cl.
CPC .......... *B60K 15/035* (2013.01); *B60W 20/00* (2013.01); *B67D 7/049* (2013.01); *B67D 7/0492* (2013.01); *B67D 7/54* (2013.01); *B60K 2015/03296* (2013.01); *B60K 2015/03576* (2013.01); *B67D 2007/0403* (2013.01); *Y10S 903/902* (2013.01)

(58) Field of Classification Search
CPC ............ B60K 15/035; B60K 15/03504; B60K 2015/03509; B60K 2015/03514; B60K 2015/0358; B60K 2015/0359; B60K 2015/03595; B60K 2015/03576; B60K 2015/03585; B60W 20/00; B67D 7/049; B67D 7/0492; B67D 7/54
See application file for complete search history.

(56) References Cited

U.S. PATENT DOCUMENTS

| 5,577,538 | A | 11/1996 | Sunderhaus et al. |
| 7,036,536 | B1 | 5/2006 | Knight et al. |
| 7,063,112 | B2 | 6/2006 | Fink, Jr. et al. |
| 8,371,346 | B2 | 2/2013 | Schmidt |
| 8,844,587 | B1 | 9/2014 | McCommons |
| 2012/0031508 | A1* | 2/2012 | Schmidt ........... B60K 15/03504 137/312 |
| 2014/0216563 | A1* | 8/2014 | Dudar ....................... B08B 5/04 137/15.04 |

FOREIGN PATENT DOCUMENTS

DE 102005009718 A1 3/2006
WO WO 200140110 A1 6/2001

OTHER PUBLICATIONS

Search Report dated Jul. 12, 2018 from the United Kingdom Intellectual Property Office regarding Application No. GB1800710.4 (4 pages).

* cited by examiner

*Primary Examiner* — Jacob Amick
(74) *Attorney, Agent, or Firm* — Frank A. MacKenzie; Bejin Bieneman PLC

(57) ABSTRACT

A fuel drip retention system includes a computer programmed to actuate one of a pump or a starter motor to generate a vacuum in an evaporation line between a fuel nozzle receiving port and a vapor canister. The vacuum is generated upon determining that fuel has stopped flowing into a fuel tank.

17 Claims, 6 Drawing Sheets

FUEL DRIP RETENTION

BACKGROUND

A fuel station pump may include a fuel nozzle with a lever handle for controlling fuel flow from the fuel nozzle. A fuel nozzle is placed into a desired fuel receptacle, such as a fuel nozzle receiving port of a vehicle, and fuel is caused to flow from the fuel nozzle. For example, a user can squeeze the lever or the like to initiate fuel flow, or an automated robot could be used to place a fuel nozzle in a vehicle receiving port. Fueling may stop when a user releases the lever, when an electronic controller stops a pump and removes a fueling arm including a nozzle, etc. In one example, especially if a fuel pump is manually operated, a fuel station pump may automatically stop the fuel flow in response to detecting a back pressure in the fuel nozzle above a threshold amount. In any case, residual fuel droplets may remain on the fuel nozzle after fueling is stopped.

DETAILED DESCRIPTION

Introduction

Figure 1:
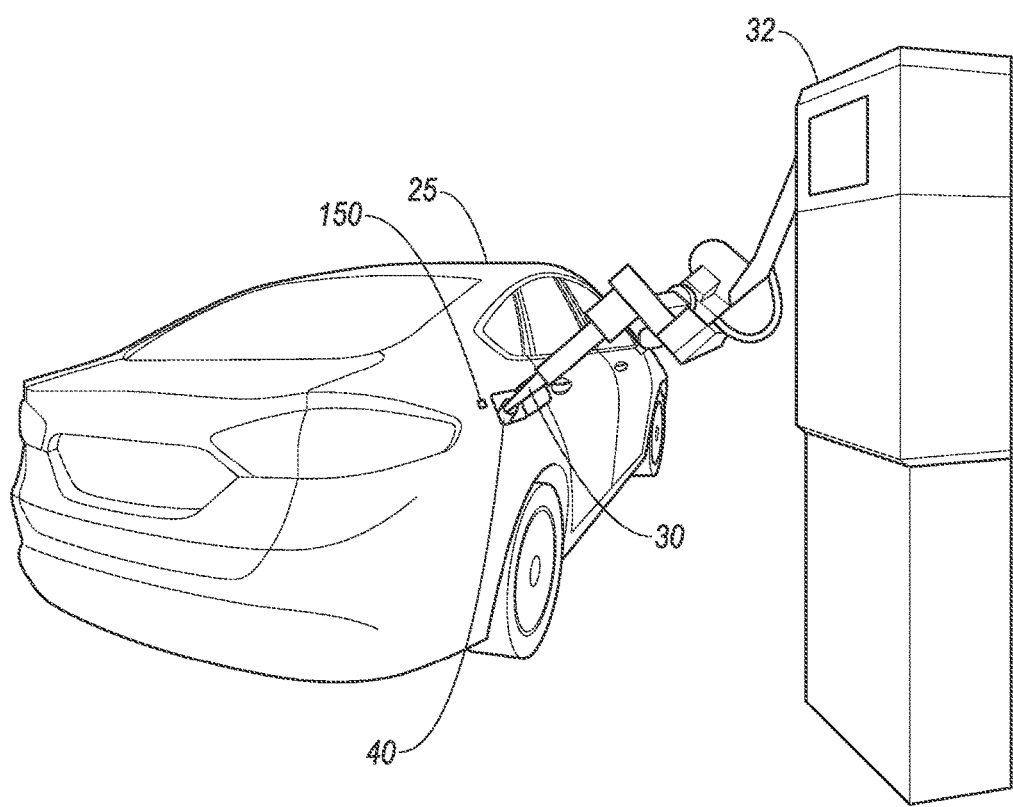
FIG. 1 is a perspective view of an example vehicle and an example automated fuel pump.
Figure 2:
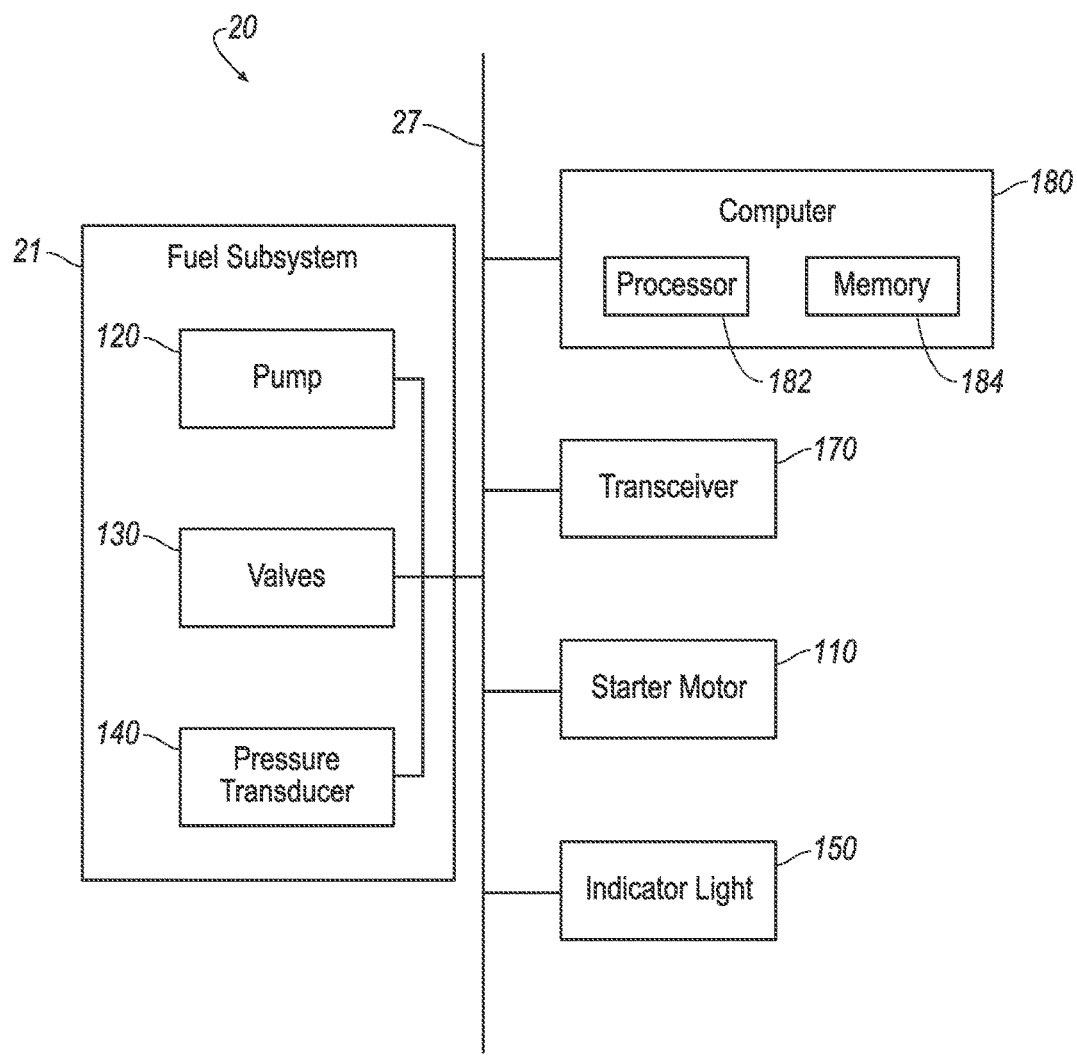
FIG. 2 is a block diagram of a vehicle fuel retention system of the vehicle of FIG. 1.

FIG. 2 is a block diagram of an example fuel drip retention system 20 for a vehicle 25 (see FIG. 1). The fuel drip retention system 20 for the vehicle 25 can evacuate fuel residing in a fuel nozzle 30 at an end of a fueling cycle, retaining the fuel in a fuel subsystem 21 of the vehicle 25 (See FIG. 3A). The system 20 includes a computer 180 programmed to actuate an air pump 120 and/or a starter motor 110 to generate a vacuum in an evaporation line 50 between a fuel nozzle receiving port 40 and a vapor canister 60 upon determining that fuel has stopped flowing into a fuel tank 45. The vacuum draws fuel droplets from the fuel nozzle 30 while the fuel nozzle 30 is inserted into a fuel nozzle receiving port 40.

In the following description, relative orientations and direction (by way of example, top bottom, above, below, vertical, horizontal, etc.) are from the perspective of an occupant seated in a driver seat, facing a dashboard of the vehicle 25. The adjectives "first" and "second" are used throughout this document as identifiers and are not intended to signify importance or order. The adjectives "high" and "low" are intended to identify quantities, amounts, and/or positions relative to each other, not absolute positon. For example, "high" is generally above "low," from the perspective of the occupant seated in the driver seat.

System

Figure 3A:
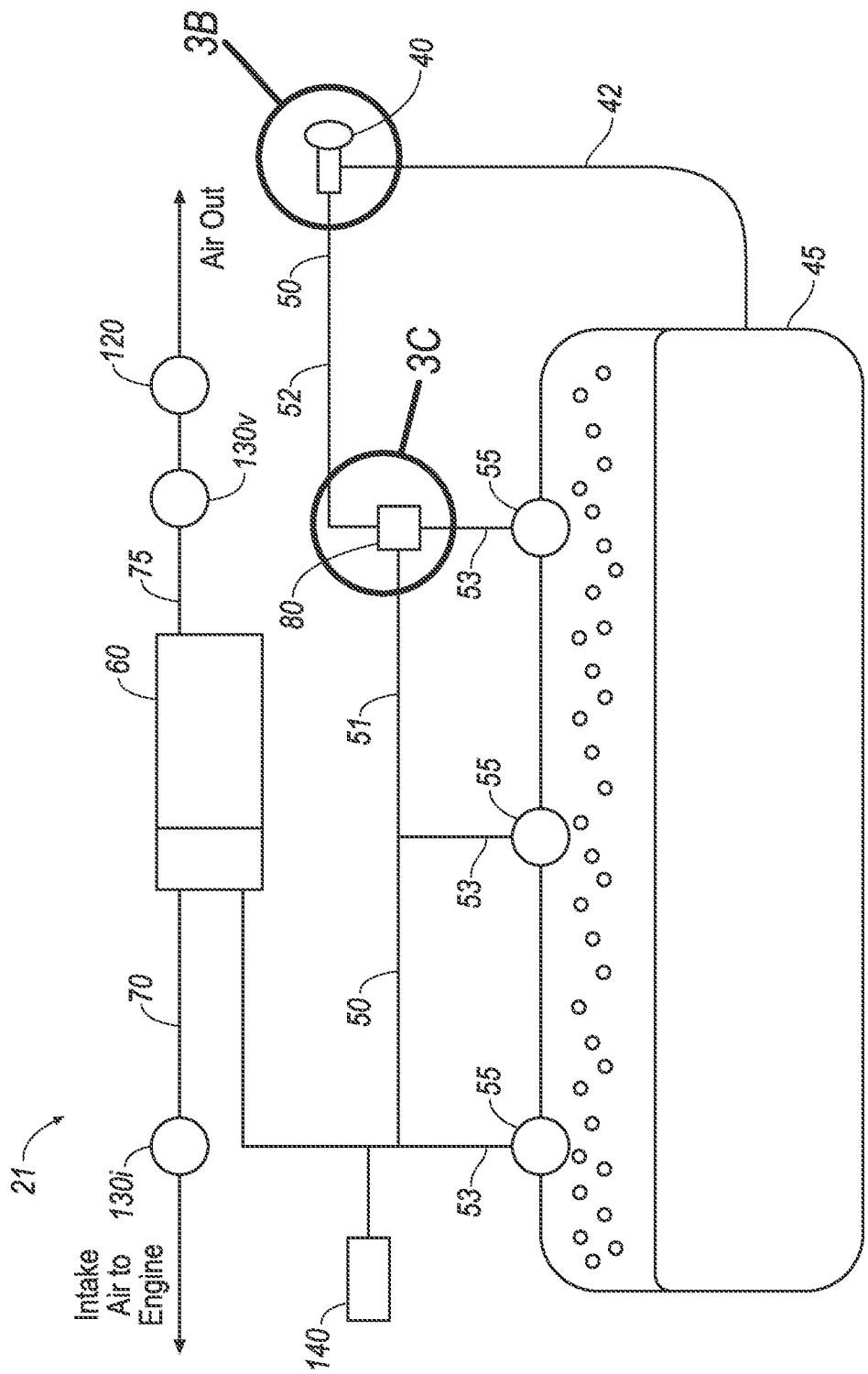
FIG. 3A is an example schematic of a fuel subsystem of the fuel retention system of FIG. 2.
Figure 3B:
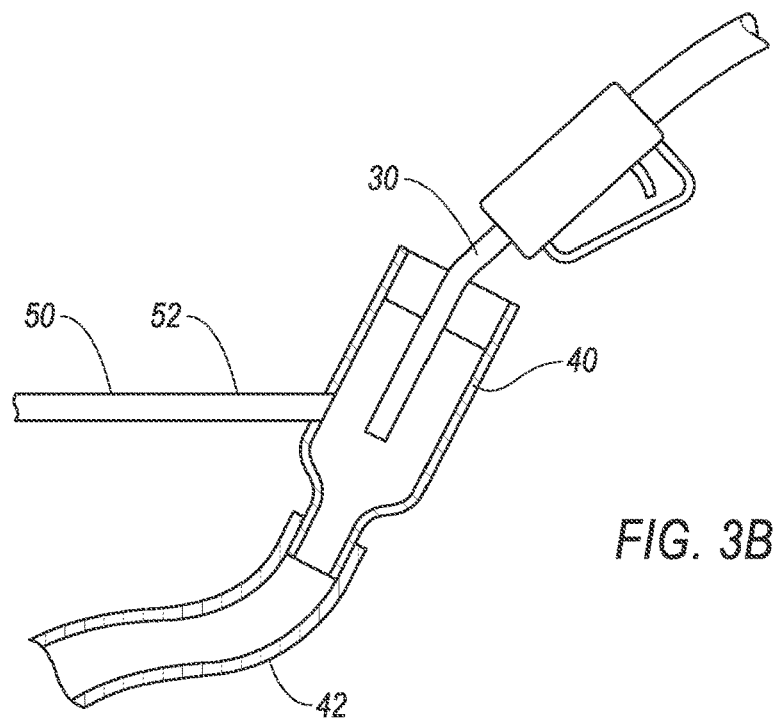
FIGS. 3B and 3C illustrate respective selected details of the fuel subsystem of FIG. 3A.
Figure 3C:
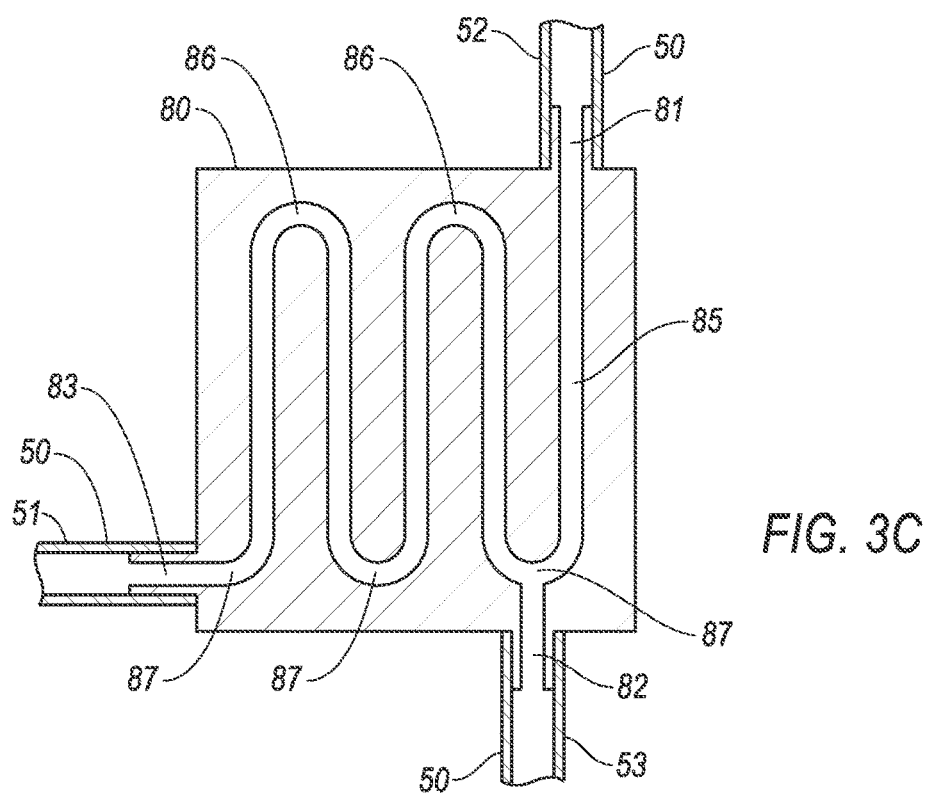

As shown in FIG. 3A, the system 20 may include the fuel subsystem 21 that includes a fuel nozzle receiving port 40, an evaporation line 50, a vapor canister 60, and a liquid trap 80. As shown in FIG. 2, the system 20 may include components in electronic communication with each other, e.g., through a vehicle communications network 27, such as a starter motor 110, an air pump 120, one or more valves 130, a pressure transducer 140, an indicator light 150, a transceiver 160, and a computer 180. The network 27 can include a communications bus or the like (e.g., a Controller Area Network or CAN bus), and/or other wired and/or wireless communications mechanisms. The system 20 may receive fuel from a fuel station pump 32 (FIG. 1).

The fuel nozzle receiving port 40 provides an opening sized for receiving a fuel nozzle 30 of the fuel station pump 32. The fuel nozzle receiving port 40 is in fluid communication with, i.e. fluid may travel from the receiving port 40 to, the evaporation line 50, and a fuel fill tube 42 connecting the fuel nozzle receiving port 40 with a fuel tank 45. Fuel provided from the fuel nozzle 30 flows to the fuel tank 45 via the fuel fill tube 42.

The evaporation line 50 provides a fluid communication link, i.e. a passage through which fluid can flow, between the fuel nozzle receiving port 40, the fuel tank 45, and the vapor canister 60. The evaporation line 50 may include a main portion 51, a recirculation portion 52, and one or more tank connection portions 53. The recirculation portion 52 of the evaporation line 50 connects the main portion 51 with the fuel nozzle receiving port 40. The tank connection portions 53 connect the main portion 51 with fuel tank 45.

A fuel tank vent valve 55 may be mounted along each of the tank connection portions 53 of the evaporation line 50, and/or at each connection location of the tank connection portions 53 of the evaporation line 50 and the fuel tank 45. The fuel tank vent valves 55 permit gas fuel vapor flow from the fuel tank 45 into the evaporation line 50, and inhibit liquid fuel flow from the fuel tank 45 into the evaporation line 50. For example, the fuel tank vent valves 55 may be floating ball type check valves where rising liquid fuel levels in the fuel tank 45 float a ball within the valve to cover an opening of the valve, thereby closing the valve to inhibit liquid flow through the valve.

The vapor canister 60 absorbs fuel vapors from the fuel tank 45, e.g., with activated carbon stored in the vapor canister 60. The vapor canister 60 is in fluid communication with the fuel tank 45, such as by the vapor canister 60 being fluidly coupled, i.e. being secured and sealed while allowing fluid to flow, to the evaporation line 50. In addition to being fluidly coupled to the evaporation line 50, the vapor canister 60 may be fluidly coupled to an engine air intake line 70 and a vent line 75.

The engine air intake line 70 provides a fluid flow path from the vapor canister 60 to an air intake manifold of an engine of the vehicle 25, such as by the engine air intake line 70 being fluidly coupled to the air intake manifold. In such configuration, rotation of a crankshaft of the engine, such as by actuation of the starter motor 110, draws fluid through the air intake manifold, thereby creating a vacuum in the air intake line 70. The vent line 75 provides a fluid flow path from the vapor canister 60 to an outside environment, such as by the vent line 75 including an open end.

The liquid trap 80 inhibits liquid from flowing from the fuel nozzle receiving port 40 and/or the fuel fill tube 42 through the evaporation line 50 to the vapor canister 60. The liquid trap 80 may be mounted along the evaporation line 50 at a location where the recirculation portion 52 of the evaporation line 50 meets the main portion 51 and the tank connection portion 53. The liquid trap 80 may include an ingress 81, a first egress 82, and a second egress 83. The ingress 81 is fluidly coupled to the recirculation portion 52. The first egress 82 is fluidly coupled to the tank connection portion 53. The second egress 83 is fluidly coupled to the main portion 51. The liquid trap 80 separates liquid and gases that enter via the ingress 81 from the recirculation portion 52 such that liquid and gas may leave the liquid trap 80 via the first egress 82, and generally only gas may leave via the second egress 83.

The liquid trap 80 may be a labyrinth seal including a series of physical structures that direct liquid in one direction, and direct gas in another direction. For example, the liquid trap 80 may include a generally vertically aligned serpentine channel 85, i.e. a winding passage through the liquid trap 80 including two or more winds or bends that have an angle of greater than 90 degrees, with a series of high portions 86 and low portions 87. The ingress 81 may be located at one end of the serpentine channel 85 at a top of the liquid trap 80. The first egress 82 may be located at the low portion 87 nearest the ingress 81. The second egress 83 may be located at an end of the serpentine channel 85 opposite the ingress 81.

The starter motor 110 provides torque to rotate a crankshaft of an internal combustion engine mounted on the vehicle 25. For example, the starter motor 110 may be an electric motor, a pneumatic motor, or a hydraulic motor connected to the crankshaft via one or more gears, chains and sprockets, belts and pulley wheels, shafts, etc. Rotation of the crankshaft causes pistons to travel within cylinders of the engine, thereby drawing air from the air intake manifold into the cylinders. The starter motor 110 may actuate in response to commands from the computer 180. For example, the starter motor 110 may include a starter solenoid that is actuated by the computer 180 to provide electricity from a battery of the vehicle 25 to an electric motor of the starter motor 110.

The air pump 120 pumps air from an inlet of the air pump 120 to an exhaust of the air pump 120, such as with an electric motor used to spin a veined wheel mounted in a housing where the inlet is located on the housing close to a center of the wheel and the outlet is located on the housing at a periphery of the wheel. The air pump 120 may be mounted along the vent line 75 such that the air pump 120 draws from the vent line 75 on a side of the air pump 120 closest to the vapor canister 60 and exhausts to the vent line 75 on a side closest the open end of the vent line 75, thereby creating a vacuum in the vent line 75 on the side of the air pump 120 closest to the vapor canister 60. The air pump 120 may actuate in response to a signal commanding the motor of the air pump 120 to spin, such as proving an electrical voltage load to the motor.

One or more valves 130, e.g., solenoid valves, may be actuated between an open state and a closed state in response to an electronic command signal from the computer 180. Each valve 130 includes a first opening and a second opening. In the open state, fluid flow is permitted between the first and second openings. In the closed state, fluid flow is inhibited between the first and second openings. A valve 130v may be mounted along vent line 75 such that opening or closing the valve 130v permits or inhibits fluid flow through the vent line 75. A valve 130i may be mounted along the engine air intake line 70 such that opening or closing the valve 130i permits or inhibits fluid flow through the engine air intake line 70.

The pressure transducer 140, in the present example, is in fluid communication with the evaporation line 50 to measure the pressure of fluid therein. The pressure transducer may output a signal including pressure data measured by the pressure transducer 140.

The indicator light 150, shown in FIGS. 1 and 2, provides a visual indication to a user regarding that the fuel nozzle 30 may be removed from the fuel nozzle receiving port 40. The light 150 may include, for example, an incandescent lamp, light emitting diodes (LEDs), etc. The indicator light 150 may be mounted on the vehicle 25, such as near the fuel nozzle receiving port 40, on a side view mirror oriented to project light at a ground near the fuel nozzle receiving port 40, etc. The indicator light 150 may actuate between an on (illuminated) and an off (not illuminated) state in response to a received control signal, such as from the computer 180.

The transceiver 160 transmits and receives information wirelessly from other transceivers, enabling signals, data and other information to be exchanged with other computer and network systems, such as the fuel station pump 32. The transceiver 160 is implemented via antennas, circuits, chips, or other electronic components that can facilitate wireless communication. Example transceivers 160 include Wi-Fi systems, radio transmitters and receivers, telecommunications systems, Bluetooth® systems, cellular systems and mobile satellite transceivers. The transceiver 160 may communicate with a transportation infrastructure, e.g. an intersection controller, a toll booth, the autonomous fuel station pump 32 etc., such as by using known vehicle-to-infrastructure (V2I) techniques and/or products.

The computer 180 is a computing device that includes a processor 182 and a memory 184. The computer 180 is in electronic communication with, e.g., via the vehicle communications network 27, one or more input devices for providing data to the computer 180 and one or more output devices for receiving data and/or instructions from the computer 180, e.g., to actuate an output device. Example input devices include: the transceiver 160. the pressure transducer 140, etc., as well as other sensors and/or electronic control units (ECUs) that provide data to the computer 180. Example output devices that may be actuated by the computer 180 include: the air pump 120, the valves 130, the transceiver 160, the starter motor 110, the indicator light 150, etc.

The processor 182 is implemented via circuits, chips, or other electronic components and may include one or more microcontrollers, one or more field programmable gate arrays (FPGAs), one or more application specific circuits (ASICs), one or more digital signal processors (DSPs), one or more custom integrated circuits, etc. The processor 182 is programmable to process the data and communications received via the memory 184, the transceiver 160, the pressure transducer 140, etc., as well as other sensors and/or electronic control units (ECUs) that provide data to the computer 180, e.g., on the vehicle communications network 27. Processing the data and communications may include processing to actuate the air pump 120 or the starter motor 110 to generate a vacuum in the evaporation line 50 between the fuel nozzle receiving port 40 and the vapor canister 60 upon determining that fuel has stopped flowing into the fuel tank 45.

The memory 184 is implemented via circuits, chips or other electronic components and can include one or more of read only memory (ROM), random access memory (RAM), flash memory, electrically programmable memory (EPROM), electrically programmable and erasable memory (EEPROM), an embedded MultiMediaCard (eMMC), a hard drive, or any volatile or non-volatile media etc. The memory 184 may store programming instructions for performing the processes described herein, and data collected from sensors and communications.

The computer 180 may be programmed to receive fuel pressure data. For example, the computer 180 may be programmed to receive a signal from the pressure transducer 140, including measured pressure data. The pressure data may be received substantially continuously, at timed intervals, e.g., every 200 milliseconds, etc. The received pressure data may be stored in the memory 184.

Figure 4:
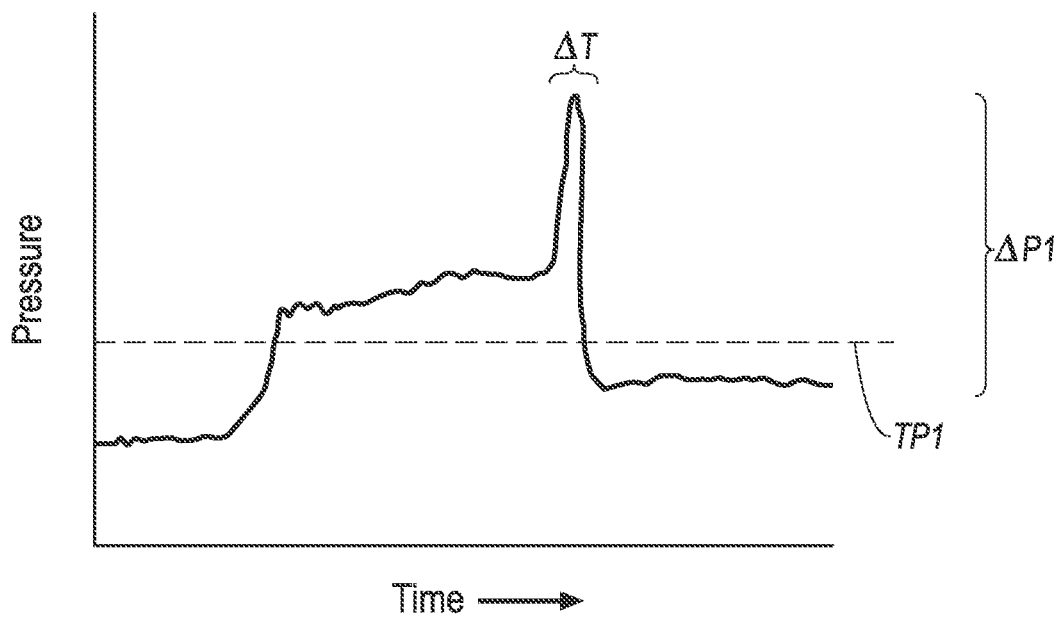
FIG. 4 illustrates a graph of measured pressure over time during a fueling cycle.

The computer 180 may be programmed to compare the pressure data to various threshold values to determine whether the current value is above or below the threshold values. Additionally or alternatively the computer 180 may be programmed to compare the pressure data to stored pressure data to determine how the measured pressure has changed within a threshold time period. For example, with reference to FIG. 4, an illustration of the measured pressure value of the fuel subsystem 21 over time is shown. The shown measured pressure value over time is an example result of a fueling cycle that ended in response to the fuel station pump 32 detecting a back pressure in the fuel nozzle 30 above a threshold amount. The computer 180 may be programed to determine: when the measured pressure has changed, such as rising or falling, by a threshold amount ΔP1 within a threshold amount of time ΔT; and/or whether the measured pressure is above or below a threshold pressure value TP1.

The computer 180 may be programmed to receive a fuel start message. The fuel start message indicates that fuel is being provided, such as to the fuel nozzle receiving port 40 from the fuel pump nozzle 30. The fuel start message may be a signal received by the transceiver 160 from the fuel station pump 32 indicating such fueling has commenced.

The computer 180 may be programmed to determine whether fuel has started flowing into the fuel tank 45. The computer 180 may be programmed to determine whether fuel has started flowing into the fuel tank 45 based at least on data received by the computer 180 from the autonomous fuel station pump 32, such as the computer 180 receiving the fuel start message via the signal received by the transceiver 160 from the autonomous fuel station pump 32. The computer 180 may be programmed to determine whether fuel has started flowing into the fuel tank 45 based at least on data received by the computer 180 from the pressure transducer 140. For example, the computer 180 may be programmed to determine fuel has started flowing when pressure data indicates the pressure measured by the pressure transducer 140 has risen a threshold amount within a threshold amount of time, e.g. +5 millimeters of mercury (mmHg) in 500 milliseconds, and/or is above a threshold value, e.g., 10 mmHg.

The computer 180 may be programmed to actuate the indicator light 150 to the on and off states, such as by sending a control signal to the indicator light 150, or by controlling the flow of electricity to the indicator light 150. The computer 180 may be programmed to actuate the indicator light 150 to an on state in response to determining fuel has started flowing into the fuel tank 45, as discussed above. The computer 180 may be programmed to actuate the indicator light 150 to an off state after completing the purge cycle discussed below.

The computer 180 may be programmed to determine whether fuel has stopped flowing into the fuel tank 45 based on a fuel stop message received via the transceiver 160 from the autonomous fuel station pump 32 indicating that fueling has ceased. Alternatively or additionally, the computer 180 may be programmed to determine whether fuel has stopped flowing into the fuel tank 45 based at least on data received by the computer 180 from the pressure transducer 140. For example, the computer 180 may be programmed to determine fuel has stopped flowing when pressure data indicates the pressure measured by the pressure transducer 140 has risen and subsequently fallen by a threshold amount within a threshold amount of time, e.g., risen by 5 mmHg then fallen by 5 mmHg in 500 milliseconds (such as when back pressure builds in the fuel nozzle 30 prompting the fuel station pump 32 to cease providing fuel whereupon pressure drops), and/or has fallen below a threshold value, e.g. 10 mmHg, such as when fuel is no longer provided to the system 20.

The computer 180 may be programmed to perform a purge cycle. The purge cycle includes generating a vacuum pressure in the evaporation line 50 between the fuel nozzle receiving port 40 and the vapor canister 60 to draw fuel droplets from the fuel nozzle 30 while the fuel nozzle 30 is inserted into the fuel nozzle receiving port 40. The vacuum may be generated with the air pump 120, and/or by spinning the engine with the starter motor 110. The purge cycle may be performed, and the vacuum generated, for a specified amount of time, e.g. 3 seconds, and/or until the computer 180 receives pressure data, such as from the pressure transducer 140, indicating that fuel tank pressure has dropped below a threshold value, e.g. −10 mmHg.

The computer 180 may be programmed to generate the vacuum for the purge cycle by actuating the air pump 120 and valves 130. For example, the computer 180 may be programmed to actuate the valve 130*i* mounted along the engine air intake line 70 to the closed state, such as by sending an electronic command signal to the valve 130*i* via the vehicle communications network 27. The computer 180 may be programmed to actuate the valve 130*v* mounted along the vent line 75 to the open position, such as by sending an electronic command signal to the valve 130*v* via the vehicle communications network 27. The computer 180 may be programmed to acute the air pump 120 to generate a vacuum in the vent line 75, such as sending a command signal or voltage load via the vehicle communications network 27 to the air pump 120 to spin the motor of the air pump 120. With the valve 130*i* mounted along to engine air intake line 70 closed, and valve 130*v* mounted along the vent line 75 open, the vacuum created by the air pump 120 extends through the vapor canister 60 and the evaporation line 50 to the fuel nozzle receiving port 40 to draw fuel droplets from the fuel nozzle 30.

The computer 180 may be programed to generate the vacuum for the purge cycle by actuating the starter motor 110 and the valves 130. For example, the computer 180 may be programmed to actuate the valve 130*i* mounted along to engine air intake line 70 to the open state, such as by sending an electronic command signal to the valve 130*i* via the vehicle communications network 27. The computer 180 may be programmed to actuate the valve 130*v* mounted along the vent line 75 to the closed position, such as by sending an electronic command signal to the valve 130*v* via the vehicle communications network 27. The computer 180 may be programmed to actuate the starter motor 110 to spin the crank shaft of the engine to generate a vacuum in the engine air intake line 70, such as by sending a command signal via the vehicle communications network 27 to the starter motor 110. While actuating the starter motor 110, the computer 180 may inhibit combustion within the cylinders of the engine, such as by refraining from or preventing actuating a fuel pump and/or spark plugs of the vehicle 25. With the valve 130*i* mounted along the engine air intake line 70 open, and valve 130*v* mounted along the vent line 75 closed, the vacuum created by spinning the engine with the starter motor 110 extends from the engine air intake line 70 through the vapor canister 60 and the evaporation line 50 to the fuel nozzle receiving port 40 to draw fuel droplets from the fuel nozzle 30.

The computer 180 may be programmed to send a purge cycle complete message to the autonomous fuel station pump 32. The purge cycle complete message indicates that the purge cycle is complete, e.g., the computer 180 is no longer actuating the pump 120 or starter motor 110 to generate the vacuum.

Process

Figure 5:
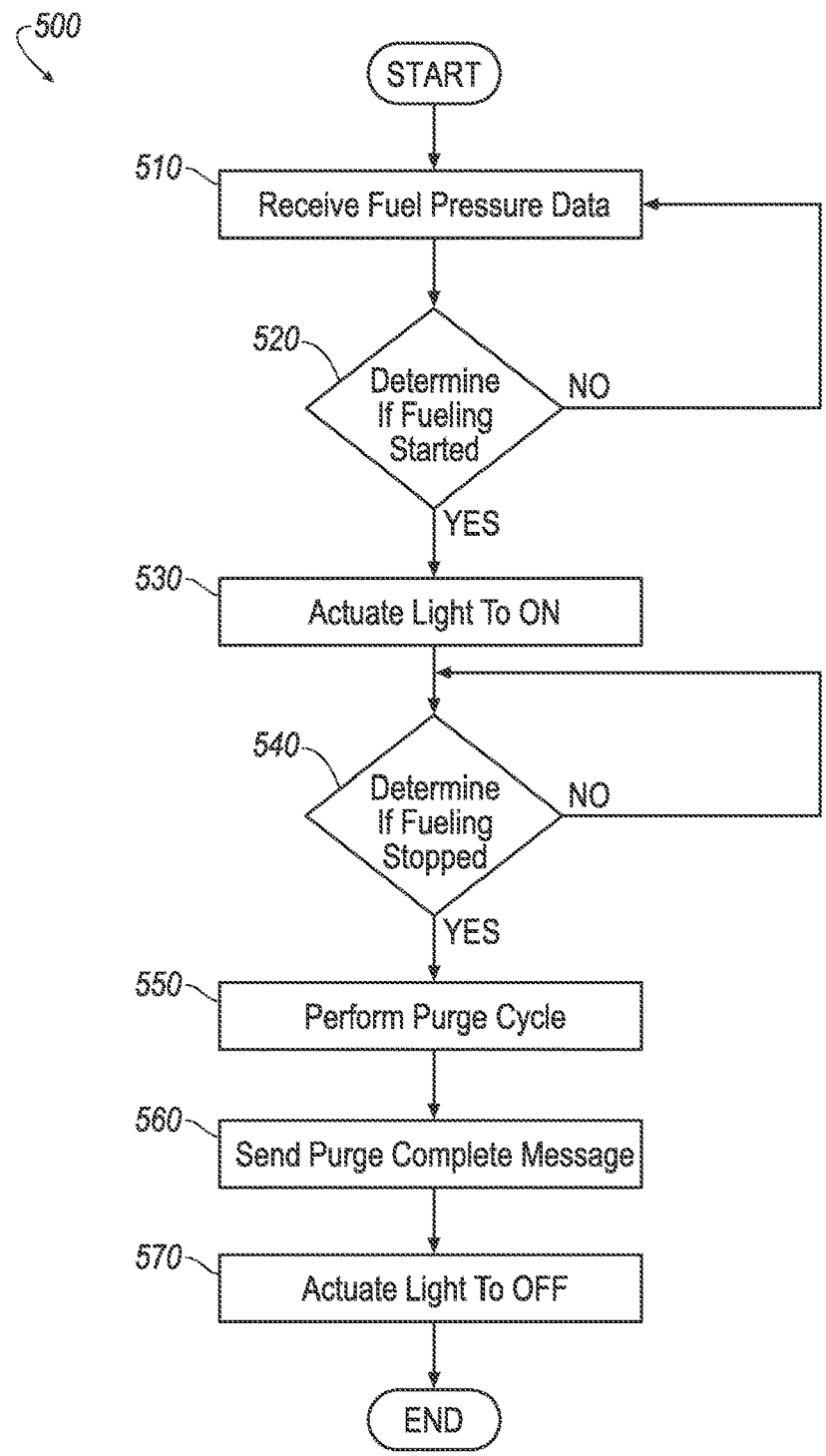
FIG. 5 illustrates a flow chart of an example process for fuel drip retention.

Referring to FIG. 5, the process 500 may begin as part of a power down process of the vehicle 25 (e.g., in a situation where fueling of the vehicle 25 could be about to commence), at timed intervals when power is supplied to the computer 180, upon a message from a fuel station pump 32, in response to a user input, or in response to a vehicle 25 state, such as the computer 180 detecting a fuel door has been opened, etc.

Next, at a block 510, the computer 180 receives fuel pressure data. For example, the computer 180 may receive a signal from the pressure transducer 140, including measured pressure data, via the vehicle communications network 27. The pressure data may be received continuously, at timed intervals, e.g., every 50 milliseconds, etc. The received pressure data may be stored in the memory 184. The computer 180 may continue to receive fuel pressure data until process 500 ends.

Next, at a block 520, the computer 180 determines whether fuel has started flowing into the fuel tank 45, e.g., based at least on the received fuel start message. The fuel start message may be received from the fuel station pump 32, a computing device such as a smart phone or other personal device, a computing device in communication with the fuel station pump 32, etc., such as via the transceiver 160. Alternatively or additionally, the computer 180 may determine that fuel has started flowing into the fuel tank 45 based at least on data received by the computer 180 from the pressure transducer 140. For example, the computer 180 may determine fuel has started flowing when pressure data indicates the pressure measured by the pressure transducer 140 has risen a threshold amount within a threshold amount of time, and/or is above a threshold value. When the computer 180 determines that fuel has started flowing, the process 500 moves to a block 530. Otherwise, the process 500 may return to the block 510 to continue running in a looped manner.

At the block 530 the computer 180 actuates the indicator light 150 to the on state, such as by sending a control signal to the indicator light 150, or by controlling the flow of electricity to the indicator light 150. The computer 180 may actuate the indicator light 150 to the on state in response to determining fuel has started flowing into the fuel tank 45 at the block 520.

At a block 540 the computer 180 determines if fuel has stopped flowing into the fuel tank 45. The computer 180 may determine that fuel has stopped flowing into the fuel tank 45 based at least on the fuel stop message. The fuel stop message may be received from the fuel station pump 32, a computing device such as a smart phone or other personal device, a computing device in communication with the fuel station pump 32, etc., such as via the transceiver 160. Alternatively or additionally, the computer 180 may determine whether fuel has stopped flowing into the fuel tank 45 based at least on data received by the computer 180 from the pressure transducer 140. For example, the computer 180 may determine fuel has stopped flowing when pressure data indicates the pressure measured by the pressure transducer 140 has risen and fallen a threshold amount within a threshold amount of time, and/or has fallen below a threshold value. When the computer 180 determines that fuel has stopped flowing, the process moves to a block 550. Otherwise, the process continues in the block 540 to determine if fuel has stopped flowing into the fuel tank 45 as described above.

At the block 550 the computer 180 performs the purge cycle as described above. Performing the purge cycle generates a vacuum in fuel nozzle receiving port 40. The vacuum draws fuel droplets that may remain on the fuel nozzle 30 after fueling into the fuel retention system 20, thereby advantageously capturing the droplets for use as an energy source and inhibiting waste and pollution of the droplets via evaporation.

At a block 560 the computer 180 sends the purge complete cycle message. For example, the purge complete cycle message may be a signal sent by the transceiver 160 to the autonomous fuel station pump 32 indicating the purge cycle has completed. The computer 180 may send the purge complete cycle message in response to the completion of the purge cycle.

At a block 570 the computer 180 actuates the indicator light 150 to the off state, such as by sending a control signal to the indicator light 150, or by controlling the flow of electricity to the indicator light 150. The computer 180 may actuate the indicator light 150 to the off state in response to the completion of the purge cycle.

Following the block 570, the process 500 ends.

Conclusion

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer comprising a processor and a memory, the memory storing instructions such that the processor is programmed to:
    actuate one of a pump or a starter motor to generate a vacuum in an evaporation line between a fuel nozzle receiving port and a vapor canister upon determining that fuel has stopped flowing into a fuel tank.

2. The system of claim 1, further comprising:
    the fuel nozzle receiving port;
    the vapor canister;
    the fuel tank;
    the evaporation line in fluid communication with the fuel nozzle receiving port, the vapor canister, and the fuel tank; and
    a liquid trap disposed along the evaporation line between the fuel nozzle receiving port and the vapor canister.

3. The system of claim 2, wherein the liquid trap includes a labyrinth seal.

4. The system of claim 2, the liquid trap further comprising:
    an ingress connected to a recirculation portion of the evaporation line;
    a first egress connected to a tank connection portion of the evaporation line; and
    a second egress opening.

5. The system of claim 4, the liquid trap further comprising:
    a serpentine channel including at least one high portion and at least one low portion;
    wherein the ingress opening is located at one end of the serpentine channel, the second egress opening is located at an opposite end of the serpentine channel, and the first egress opening is located at the low portion closest to the ingress opening.

6. The system of claim 1, wherein the determination that fuel has stopped flowing into the fuel tank is based at least on a message received from a fuel station pump.

7. The system of claim 1, wherein the determination that fuel has stopped flowing into the fuel tank is based at least on pressure data from a fuel tank pressure transducer.

8. The system of claim 7, the computer further programmed to:
    determine that the fuel has stopped flowing based at least on a pressure increase and a subsequent pressure decrease of a threshold amount as detected by the fuel tank pressure transducer within a threshold amount of time.

9. The system of claim 7, the computer further programmed to:
    determine that the fuel has stopped flowing based at least on the fuel tank pressure transducer detecting that the pressure has fallen below a threshold value.

10. The system of claim 1, the computer further programmed to:
    actuate a first valve disposed along an air intake line to a closed position;
    actuate a second valve disposed along a vent line to an open position; and
    actuate the pump, the pump disposed along the vent line.

11. The system of claim 1, the computer further programmed to:
    actuate a first valve disposed along an air intake line to an open position;
    actuate a second valve disposed along a vent line to a closed position; and
    actuate the starter motor to cycle an engine without actuating spark plugs of the engine.

12. The system of claim 1, the computer further programmed to:
    actuate the starter motor to cycle an engine without actuating spark plugs of the engine.

13. The system of claim 1, the computer further programmed to:
    determine that fuel flow into the fuel tank has begun; and
    actuate an indicator light to an on state in response to determining that the fuel flow has begun.

14. The system of claim 13, the computer further programed to:
    after generating the vacuum in the evaporation line, actuate the indicator light to an off state.

15. A method comprising:
    generating a vacuum in an evaporation line between a fuel nozzle receiving port and a vapor canister to draw fuel droplets from a fuel nozzle into a fuel system upon determining that fuel has stopped flowing into a fuel tank;
    actuating a first valve disposed along an air intake line to a first position that is one of open or closed;
    actuating a second valve disposed along a vent line to a second position that is closed if the first position is open and open if the first position is closed; and
    performing one of (1) actuating a starter motor to cycle an engine without actuating spark plugs of the engine if the first position is open or (2) actuating a pump disposed along the vent line if the first position is closed.

16. The method of claim 15 further comprising:
    determining that fuel flow into the fuel tank has begun; and
    actuating an indicator light to an on state in response to identifying the fuel flow has begun.

17. The method of claim 15 further comprising:
after generating the vacuum in the evaporation line, actuating an indicator light to an off state.

* * * * *